(12) United States Patent
Huang et al.

(10) Patent No.: US 10,367,372 B2
(45) Date of Patent: Jul. 30, 2019

(54) TRACKING DEVICE AND POWER MODULE

(71) Applicant: Passive Eye Limited, London (GB)

(72) Inventors: Jingjing Huang, London (GB); Brian Jerome Rush, London (GB)

(73) Assignee: Passive Eye Limited, London (GB)

( * ) Notice: Subject to any disclaimer, the term of this patent is extended or adjusted under 35 U.S.C. 154(b) by 65 days.

(21) Appl. No.: 15/539,710

(22) PCT Filed: Dec. 24, 2015

(86) PCT No.: PCT/GB2015/054164
§ 371 (c)(1),
(2) Date: Jun. 26, 2017

(87) PCT Pub. No.: WO2016/102977
PCT Pub. Date: Jun. 30, 2016

(65) Prior Publication Data
US 2017/0373526 A1 Dec. 28, 2017

(30) Foreign Application Priority Data
Dec. 24, 2014 (GB) .................................. 1423214.4

(51) Int. Cl.
H02J 7/00 (2006.01)
H02J 7/34 (2006.01)
H04W 4/02 (2018.01)

(52) U.S. Cl.
CPC ............ *H02J 7/345* (2013.01); *H02J 7/0013* (2013.01); *H02J 7/0021* (2013.01); *H04W 4/023* (2013.01)

(58) Field of Classification Search
CPC ....................................................... H02J 7/345
(Continued)

(56) References Cited

U.S. PATENT DOCUMENTS

2009/0200983 A1* 8/2009 Dyer .......................... H02J 7/32
320/107
2009/0312046 A1 12/2009 Clevenger
(Continued)

FOREIGN PATENT DOCUMENTS

EP 1528652 5/2005
EP 2482332 8/2012
(Continued)

OTHER PUBLICATIONS

PCT Search Report and Written Opinion PCT/GB2016/054164, dated Jul. 8, 2016.
GB Patent Office Search, Jul. 17, 2015.

Primary Examiner — Suresh Memula
(74) Attorney, Agent, or Firm — Dekel Patent Ltd.; David Klein

(57) ABSTRACT

A tracking device (100) comprises a power module (102) and a tracking operations module (104). The power module (102) includes two electrical power storage cells in the form of a super-capacitor (110) and a rechargeable battery (112); an energy harvester (106) for generating electrical power to charge the electrical power storage cells (110, 112) and a power management controller (108) arranged to control charging of the first (110) and second (112) power storage cells. The tracking operations module (104) includes a GPS module (122, 124) for receiving data about a location of the tracking device (100); a GSM module (126, 128) for transmitting the data about the location of the tracking device (100); a motion sensor (136); and processing means (118) arranged to: detect movement of the device (100) based on an output of the motion sensor (136); and manage receipt and transmission of the data about the location of the tracking device (100).

20 Claims, 6 Drawing Sheets

(58) Field of Classification Search
USPC .......................................................... 320/119
See application file for complete search history.

(56) References Cited

U.S. PATENT DOCUMENTS

| | | | | |
|---|---|---|---|---|
| 2010/0084208 A1* | 4/2010 | Chen | ................... | B60L 11/1881 |
| | | | | 180/65.31 |
| 2013/0335001 A1* | 12/2013 | Bianconi | ............... | H02J 7/0034 |
| | | | | 320/101 |
| 2014/0210401 A1* | 7/2014 | Di Cristofaro | ....... | H02J 7/0022 |
| | | | | 320/107 |
| 2015/0359127 A1* | 12/2015 | Daoura | .................. | G06Q 10/00 |
| | | | | 320/101 |

FOREIGN PATENT DOCUMENTS

| | | |
|---|---|---|
| EP | 2676155 | 8/2012 |
| EP | 2590249 | 5/2013 |
| GB | 2409363 | 6/2005 |
| JP | 2012029513 | 2/2012 |
| WO | 2010/015856 | 2/2010 |

\* cited by examiner

TRACKING DEVICE AND POWER MODULE

TECHNICAL FIELD

The present invention relates to a tracking device and a power module. The power module is suitable for use in the tracking device and in other mobile devices.

BACKGROUND TO THE INVENTION AND PRIOR ART

Electronic tracking devices are used to provide a third party with information about a location of an object or person that is being tracked. Due to the fact that the object or person that is being tracked has the potential, by implication, to be mobile, the tracking device cannot be attached to a fixed power supply. Where the tracking device is used to track an object which generates its own electrical power, such as a vehicle, the tracking device can be coupled to the electrical power supply of the object. However, for the tracking device to work effectively its operation should not be contingent on electrical power being supplied by the object which it is being used to track, in case the power supply of the tracked object is intentionally disconnected or accidentally fails. Similarly, for objects which do not have an electrical power supply to share with the tracking device, the tracking device must be autonomously powered. This power is typically provided by batteries, which typically require regular maintenance and charging.

Furthermore, in many cases it is advantageous for the presence and location of the tracking device to be hidden to prevent its discovery, in order that it cannot be tampered with or removed from the object or person. To that end there is a general desire to reduce the size of the tracking device. This presents challenges to the designers of such devices, since where the tracking device is powered by a battery reducing the overall size of the device will result in the use of a battery with a reduced storage capacity than would be possible with a larger tracking device. Hence, it can be seen that where the tracking device is powered by internal power cells, power management of the device is a critical issue. This also affects the manner in which the device operates, since the rate at which the location of the device is acquired and passed on to a remote server will impact directly on the operating life of a battery powered tracking device.

It is an aim of the present invention to provide an improved tracking device which mitigates some of these problems and to provide a power module for use in such a device.

SUMMARY OF INVENTION

According to a first aspect of the invention, there is provided a power module for a mobile device, the power module comprising: first and second electrical power storage cells of different types; an energy harvester for generating electrical power to charge the electrical power storage cells; a switch for routing the generated electrical power to one of the first and second electrical power storage cells; and processing means arranged to monitor the electrical power stored in one or both of the electrical power storage cells and control the switch.

According to a second aspect of the invention, there is provided a tracking device comprising: a power management module as defined above; means for receiving data about a location of the tracking device; means for storing the data about the location of the tracking device; means for wirelessly transmitting the data about the location of the tracking device; and a motion sensor; wherein the processing means are further arranged to manage receipt and transmission of the data about the location of the tracking device.

The first electrical power storage cell may be a supercapacitor. The second electrical power storage cell may be a rechargeable battery, such as a lithium polymer battery. The first electrical power storage cell may have a storage capacity much less than the storage capacity of the second electrical power storage cell. For example, the storage capacity of the first electrical power storage cell may be 1% of the storage capacity of the second electrical power storage cell.

When the first electrical power storage cell is to be charged the processing means may be arranged to initially charge the first electrical power storage cell and subsequently to charge the second electrical power storage cell.

The processing means may be arranged to monitor the electrical power stored both of the electrical power storage cells and when both the first and second electrical power storage cells are to be charged the processing means is arranged to initially charge the first electrical power storage cell and subsequently to charge the second electrical power storage cell.

The processing means may be arranged to control the switch: to charge the first electrical power storage cell until the power stored in the first electrical power storage cell exceeds a first threshold; to then charge the second electrical power storage cell; and when the power stored in the first electrical power storage cell falls below a second threshold which is lower than the first threshold, to then recharge the first electrical power storage cell.

The first and second threshold power levels may be determined by monitoring a voltage of the first electrical power storage cell and are first and second threshold voltages respectively.

The energy harvester may be such that the tracking device does not need to receive electrical charge from an external electrical power supply.

The energy harvester harvests ambient time-variant environmental energy and may be one or more of a photovoltaic cell, a kinetic energy electric charge harvester/generator, a thermo-energy harvester and an ambient radio frequency harvester. The skilled person will understand that other types of energy harvester may be used.

The kinetic energy harvester may comprise at least one of a piezoelectric sensor and an electromagnetic sensor.

The means for receiving data about a location of the tracking device may be a GPS module.

The means for transmitting data about the location of the tracking device may be a radio frequency transceiver such as a GSM, UMTS, LTE or ISM band transceiver.

The processing means may be a single or a plurality of microprocessors.

According to a further aspect of the invention there is provided a method of charging a power module as described above, comprising: charging the first electrical power storage cell until the power stored in the first electrical power storage cell exceeds a first threshold; then charging the second electrical power storage cell; and when the power stored in the first electrical power storage cell falls below a second threshold which is lower than the first threshold, then recharging the first electrical power storage cell.

The first and second threshold power levels may be determined by monitoring a voltage of the first electrical power storage cell and are first and second threshold voltages respectively.

According to a further aspect of the invention there is provided a method of tracking an object, comprising:
(a) attaching to the object a tracking device as described above;
(b) generating electrical power in the energy harvester;
(c) charging the first electrical power storage cell;
(d) when the charge in one or both of the first and second electrical power storage cells provides a voltage equal to or greater than a third threshold voltage, receiving data about a location of the tracking device;
(e) storing the data about the location of the tracking device;
(f) when the charge in one or both of the first and second electrical power storage cells provides a voltage equal to or greater than a fourth threshold voltage, transmitting the data about the location of the tracking device.

The method may further comprise: charging the second electrical power storage cell when the stored electrical power in the first electrical power storage cell reaches a threshold power, and automatically switching back from the second electrical power storage cell to charge first electrical power storage cell the when stored electrical power in the first electrical power storage cell reaches a lower threshold level of power.

The method may further comprise repeating steps (d) to (f) after a predetermined period of time has elapsed since the data about the location of the tracking device was last transmitted.

The method may further comprise repeating steps (d) to (f) after a manual interrupt, such as activation of an alarm or panic button.

The method may further comprise:
(g) detecting movement of the tracking device;
(h) repeating steps (d) and (e);
(i) comparing the last two locations of the tracking device to determine if the tracking device has actually changed location;
(j) if the change in location exceeds a predetermined amount, repeating step (f); and
(k) if the change in location is less than a predetermined amount, repeating steps (g) to (j) after a predetermined period of time.

The tracking device is designed for autonomous operation which is accomplished by the interaction of on-board power harvesting and/or power generation devices (Micro-Electro-Mechanical Systems, or MEMS) and a power management system that balances the high speed recovery of energy with a device for the slower charging and longer term storage of energy. This arrangement aims to ensure that sufficient power is available to send a position report without the periodic need for manual battery recharging or battery replacement under normal operating conditions.

If the tracking device is positioned on a 'target' that is not designed to move, the user can select to have an alert message issued automatically if the motion sensor detects movement over a user defined period or for a user defined number or sequence of events.

The software associated with the tracking device features the ability for the user to create multiple geo-fences of user defined shapes and sizes. An alert will be issued automatically by the software on the server when the tracking device crosses a geo-fence boundary.

The tracking device features a watchdog function for the detection of failures due to interferences and which, if necessary, will automatically launch a restart of the system. This guarantees an autonomic operation at all times and is under the control of the micro-controller unit.

BRIEF DESCRIPTION OF THE DRAWINGS

The invention will now be described by way of example with reference to the drawings, in which.

DETAILED DESCRIPTION OF THE DRAWINGS

Figure 1:
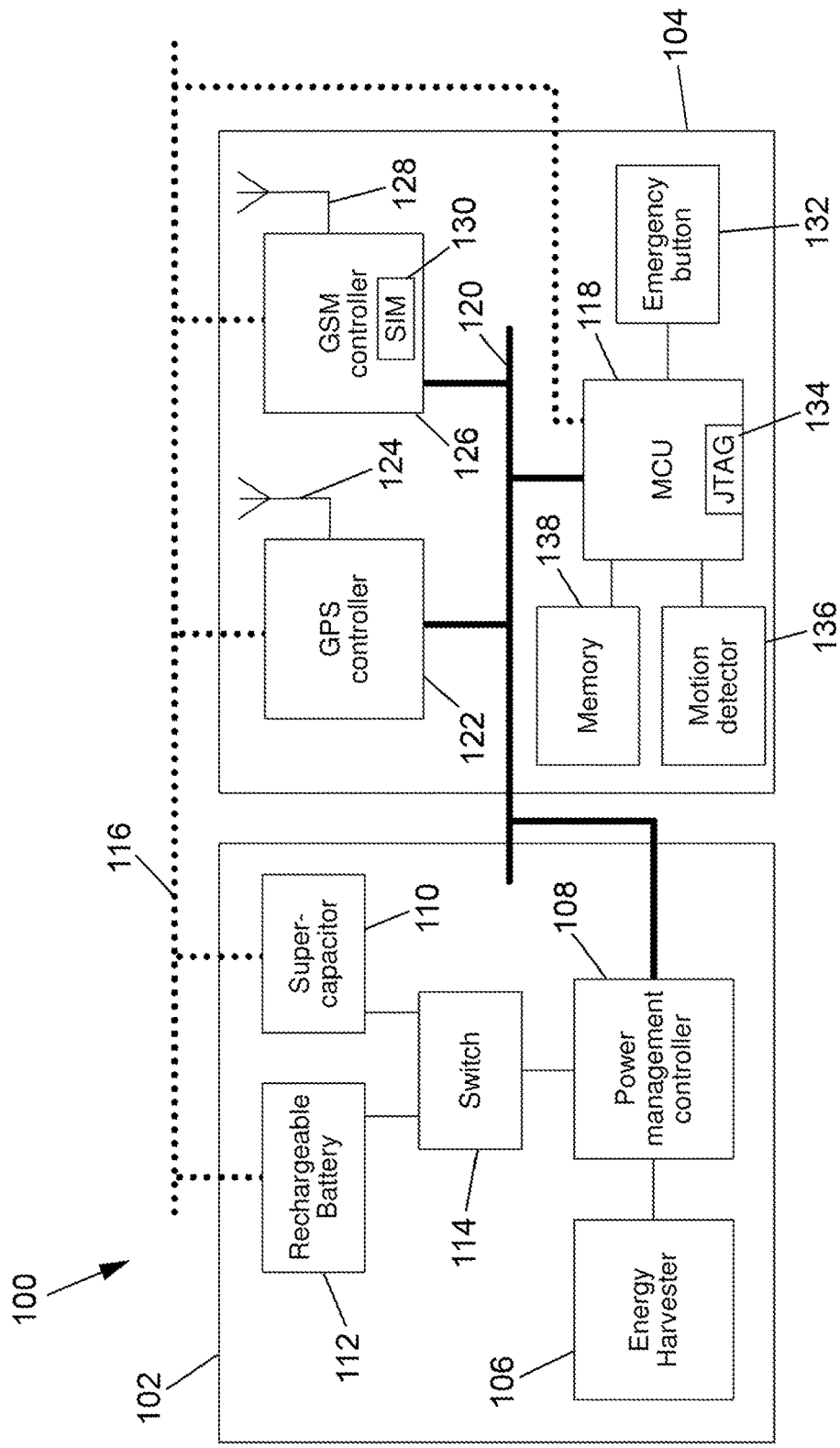
FIG. 1 is a block diagram of the tracking device comprising a power module and a tracking operations module in accordance with an embodiment of the invention.

FIG. 1 is a block diagram of a tracking device 100 in accordance with an embodiment of the invention. The tracking device 100 is comprised of two functional modules, namely a power module 102 and a tracking operations module 104. The power module 102 is connected to the tracking operations module 104 by a power bus 116 and a control bus 120, as is described below.

The power module 102 comprises an energy harvester device and/or a power generation device 106 which is coupled to a power management controller 108. The energy harvester 106 generates electrical power from external (non-electrical) ambient sources, even where the external sources may provide only miniscule amounts of power. The energy harvester 106 may be one or more of a photovoltaic cell, a kinetic energy harvester, a thermo-electric harvester and an ambient radio frequency harvester or other passive energy scavenging device. In particular, the kinetic energy harvester may be at least one of a piezoelectric device and an electromagnetic generation device. Since the tracking device 100 autonomously generates its own electrical energy through the energy harvester 106, it does not need to receive electrical charge from an external electrical power supply. This means that the tracking device 100 does not need to be recharged or to have its power cells replaced. Consequently, the tracking device 100 is a zero maintenance device which is able to operate perpetually.

Once energy has been harvested in the energy harvester 106, it is fed into the power management controller 108. Depending on the type of energy harvester 106 deployed, the current provided by the energy harvester 106 to the power management controller 108 may be AC or DC. In this embodiment the power management controller 108 requires a DC power input, therefore if the current provided by the energy harvester 106 is AC then a rectifier is used between an output of the energy harvester 106 and an input of the power management controller 108. The skilled person will understand that where the power management controller 108 requires an AC input and the energy harvester 106 produces a DC output then an inverter can be used between the output of the energy harvester 106 and the input of the power management controller 108.

The electrical energy generated in the energy harvester 106 is used to power the power management controller 108 which routes electrical energy to charge a first electrical power storage cell in the form of a super-capacitor 110 and a second electrical power storage cell of a different type, in the form of a rechargeable battery 112. The super-capacitor 110 used in this embodiment is produced by Eaton Bussman (manufacturer's part number: PM-5R0H305-R) having a capacity of 3 farads and a nominal voltage of 5 volts. The rechargeable battery 112 used in this embodiment is a lithium polymer battery having a capacity of 250 mAh and a nominal voltage of 4.2 volts, such batteries being widely available. An advantage of using these components is that they have a small footprint whilst having energy charging and storage characteristics which match the energy generation characteristics of the energy harvester 106 and the power consumption requirements of the other components of the tracking device 100. Thus, when these components operate together they are able to provide continuity of service under typical operating conditions.

A switch 114 is provided and controlled by the power management controller 108 to direct power to one of the super-capacitor 110 and the rechargeable battery 112 when charging these first and second electrical power storage cells 110, 112. The operation of the power management controller 108 to charge these power storage cells 110, 112 is described in the flowchart of FIG. 2. In particular, when there is no stored charge in either of the super-capacitor 110 and the rechargeable battery 112, the power management controller 108 directs the switch 114 to first charge the super-capacitor 110. The power management controller 108 monitors the voltage levels of the super-capacitor 110 and once the power management controller 108 determines that the super-capacitor 110 is fully charged the power management controller 108 directs the switch 114 to charge the rechargeable battery 112.

When a new device 100 is initially activated there will be no electrical charge stored in the rechargeable battery 112 or in the super-capacitor. Similarly, if these power reserves have been completely depleted and the device starts from 'cold', the initial start-up is controlled by the power management controller 108 of the power module 102, as described in the paragraph immediately above.

Figure 2:
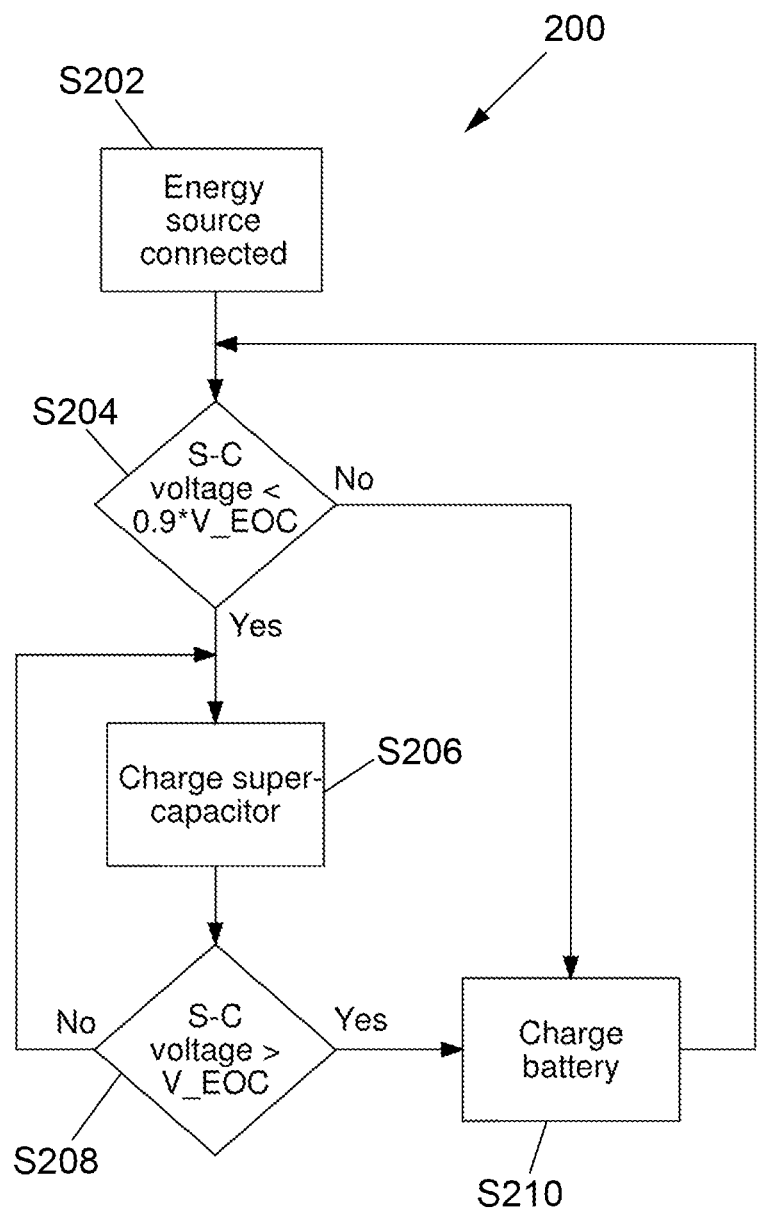
FIG. 2 is a flowchart showing the operation of the power module of FIG. 1.

FIG. 2 is a flowchart 200 showing the operation of the power module of FIG. 1. At step S202 the energy harvester 106 begins to collect energy and power is provided to the power management controller 108. At step S204 the power management controller 108 determines if the voltage of the super-capacitor 110 is less than 0.9 of V_EOC. V_EOC is the super-capacitor end of charge voltage and is referred to below as a first threshold voltage. In this embodiment V_EOC is 5.0 V, hence 0.9 (90%) of V_EOC is 4.5 V and is referred to below as a second threshold voltage. The voltage of V_EOC is chosen as the maximum voltage that the super capacitor can safely bear without damage. Similarly the level of 0.9 of V_EOC, which is programmable, is chosen so that the energy released by the super-capacitor when its voltage declines from V_EOC to 0.9 of V_EOC is enough for one full operation (position update via GPS, industrial, scientific and medical (ISM) band or other suitable transport protocol and data upload via GPRS). The skilled person will understand that in other embodiments and with different components V_EOC and the lower proportion thereof may be set at different voltage levels.

The logic regulating the reporting frequency may be determined in most cases by the time required for the energy that is harvested and/or generated during the interval between two neighbouring reports to be greater than the energy released by the first electrical power storage cells 110 in order to acquire the location data and to send a position report, so that the surplus energy can be passed on to the second electrical power storage cells 112. In this way, when starting from an empty first electrical power storage cell 110 and a fully discharged second electrical power storage cell 112, the waiting time before the device is powered up and able to send a position report is significantly shorter than if a single electrical power storage cell configuration was employed.

If at step S204 the power management controller 108 determines that the voltage of the super-capacitor 110 is less than 0.9*V_EOC (the second threshold voltage) the process proceeds to step S206 where the power management controller 108 controls the switch 114 to route electrical charge to the super-capacitor 110. This charging of the super-capacitor 110 continues until at step S208 the power management controller 108 determines that the voltage of the super-capacitor 110 has exceeded V_EOC (the first threshold voltage). At this point the power management controller 108 will toggle the switch 114 to divert the electrical charge to the rechargeable battery 112, at step S210.

If at step S204 the power management controller 108 determines that the voltage of the super-capacitor 110 is not less, i.e., greater than 0.9 of V_EOC, the process proceeds to step S210 where the power management controller 108 controls the switch 114 to route electrical charge to the rechargeable battery 112.

While the rechargeable battery 112 is charging at step S210, the super-capacitor 110 is being used to power the MCU 118 (as described below), to obtain a position using the GPS system, to send a position report and to operate the other components. Since current is being drawn from the super-capacitor 110 the voltage of the super-capacitor 110 will drop. Hence, the charging of the battery 112 at step S210 continues whilst the voltage of the super-capacitor 110 is greater than 0.9*V_EOC. However, once the power management controller 108 determines at step S204 that the voltage of the super-capacitor 110 has fallen below 90% of V_EOC, the power management controller 108 redirects the flow of power generated in the energy harvester 106 away from the rechargeable battery 112 and back to the super-capacitor 110 which very quickly builds up its power level back to V_EOC. In other words, the loop of steps S204 and S210 continues until the voltage of the super-capacitor 110 exceeds V_EOC.

The super-capacitor 110 charges very quickly but will leak power over time. The rechargeable battery 112 charges more slowly but will hold a much larger charge and has a very slow leakage rate. Only one of the super-capacitor 110 and the rechargeable battery 112 can be charged at any one time, i.e., these power cells cannot be charged simultaneously. Both can discharge simultaneously and both can therefore be used to power the tracking device 100.

If the power from the energy harvester 106, for whatever reason, ceases, and the super-capacitor 110 continues to provide power to the tracking device 100, it will eventually arrive at the 90% of V_EOC level whereupon the power management controller 108 will switch and direct any inflowing power to the super-capacitor 110. If no power is being harvested, the rechargeable battery 112 will continue to provide the power for the tracking device 100. When power once again is acquired by the energy harvester 109, it is directed to the super-capacitor 110 until it achieves the V_EOC level whereupon the power cycle described above is resumed.

This combination provides sufficient power to give continuity of operation even through periods when the energy harvester 106 can only scavenge a trickle of power.

The reason for this arrangement is that, although the super-capacitor 110 has a low energy storage capacity compared to the rechargeable battery 112, it can be fully charged (i.e., reach a desired output voltage) in a very short period of time compared to the rechargeable battery 112. By using a super-capacitor 110 the tracking device 100 has a short 'recovery' time in which it can 'come back to life', which can be as little as six minutes under moderately good energy harvesting conditions. In this manner the energy harvested in the energy harvester 106 can be used to charge the rechargeable battery 112 'in the background' whilst the tracking device 100 is powered by electrical energy stored in the super-capacitor 110.

The power management controller 108 is a Texas Instruments TI BQ25504 integrated circuit (IC) which supports and manages the energy-collection channel and the energy-storage elements 110, 112. Its functions further include managing the flow of power from/to the storage elements 110, 112, while ensuring that power is not drawn when the stored energy is below a threshold value and would be wasted. The power management controller 108 prevents the storage elements 110, 112 from over-charging and over discharging. The default condition of the power management controller 108 from when there is insufficient available energy stored in the power storage cells 110, 112 is as follows. The first trickle of power first charges a buffer capacitor of the power management controller 108 and then passes the power flow through to the super-capacitor 110 which in turn is sent to the control bus 120 to power the MCU 118 when sufficient power has been reached.

Electrical charge is provided from the power module 102, in particular from the super-capacitor 110 and the rechargeable battery 112, to the other parts of the tracking device 100 by means of the power bus 116, which is represented by a broken thick line. The power bus 116 provides current to the components of the tracking operations module 104 at multiple working voltages as required by the various components ranging between 1.8 V to 3.7 V. Since not all of the components of the tracking operations module 104 require input power at the same voltage as is provided on the power bus 116, the power bus 116 may additionally include DC-to-DC converters (not shown). Furthermore, since the voltage of the power bus 116 drops or otherwise fluctuates as the electrical energy stored in the electrical power storage cells 110, 112 is depleted and a varying amount of current is drawn by the components of the tracking operations module 104, such DC-to-DC converters must be used to regulate the input voltage of the components of the tracking operations module 104 at the required stable levels.

Once the power level of the super-capacitor 110 drops below a level of the recharge second threshold voltage of 0.9*V_EOC, the super-capacitor 110 is recoupled to the energy harvester 106 by the power management controller 108 via the switch 114 and the rechargeable battery 112 is decoupled from the energy harvester 106 and the power management controller 108. If the voltage provided by the rechargeable battery 112 to the power bus 116 is sufficient to power the components of the tracking operations module 104, current is drawn from the rechargeable battery 112, otherwise the power management controller 108 causes the rechargeable battery 112 to maintain its stored power. As stated above, the power cells 110 and 112 can be discharged at the same time but they cannot be charged at the same time.

The tracking operations module 104 comprises a microcontroller unit (MCU) 118 which communicates with a Global Positioning System (GPS) controller 122 and a GSM® controller 126 via the control bus 120, which is represented in FIG. 1 as a solid thick line. The GPS controller 122 is coupled to a GPS antenna 124 to form a GPS module which functions as a means for receiving data about a location of the tracking device 100. In this embodiment the microcontroller unit (MCU) 118 is produced by Renesas® and the GPS controller 122 includes a U-blox® EVA-7M chip, although other GPS controller chips can be used.

The GSM controller 126 is coupled to a GSM antenna 128 to form a GSM transceiver module which functions as a means for transmitting data about a location of the tracking device 100. This data takes the form of position reports which are sent to a server via low energy radio, GPRS ISM band, SMS or other means designed for machine-to-machine (M2M) communications. In this embodiment the GSM controller 126 includes a U-blox® SARA-G350 chip, although other GSM controller chips can be used. A subscriber identity module (SIM) 130 is associated with the GSM controller 126 to provide the tracking device 100 with a unique identity for a GSM network (not shown) which communicates with the tracking device 100 via the GSM controller 126 and associated antenna 128. The position report may include information such as a unique identifier of the tracking device 100, the date, time and GPS coordinates of the tracking device 100. The GSM controller 126 and antenna 128 can also be used to determine a location of the tracking device 100 where GPS is not available, for example inside a building, using GSM cell information to approximate the location.

The MCU 118 communicates with the GPS controller 122 and the GSM controller 126 via the control bus 120 to control the operation of the GPS controller 122 and the GSM controller 126. Each of the MCU 118, the GPS controller 122 and the GSM controller 126 is powered via the power bus 116. The tracking operations module 104 further comprises an emergency button 132, motion detector 136 and non-volatile memory (storage means) 138, each of which is coupled to the MCU 118. The MCU 118 is provided with a JTAG test access port 134.

The emergency button 132 supports manual emission of an alert message using the GSM controller 122 and antenna 124, as is described below. The tracking device 100 is also configured to respond to a third party originated "where are you now?" request instigated through a remote user interface, for example at a smartphone, tablet, computer, etc. The operation of this function is similar to the operation of the tracking device 100 after activation of the emergency button 132, as is also described below. When the emergency button 132 is depressed, the MCU 118 initiates the sending of the current position report of the tracking device 100 back to the third part via the server if the power level allows. The operation of the motion sensor 136 is described below.

Figure 3:
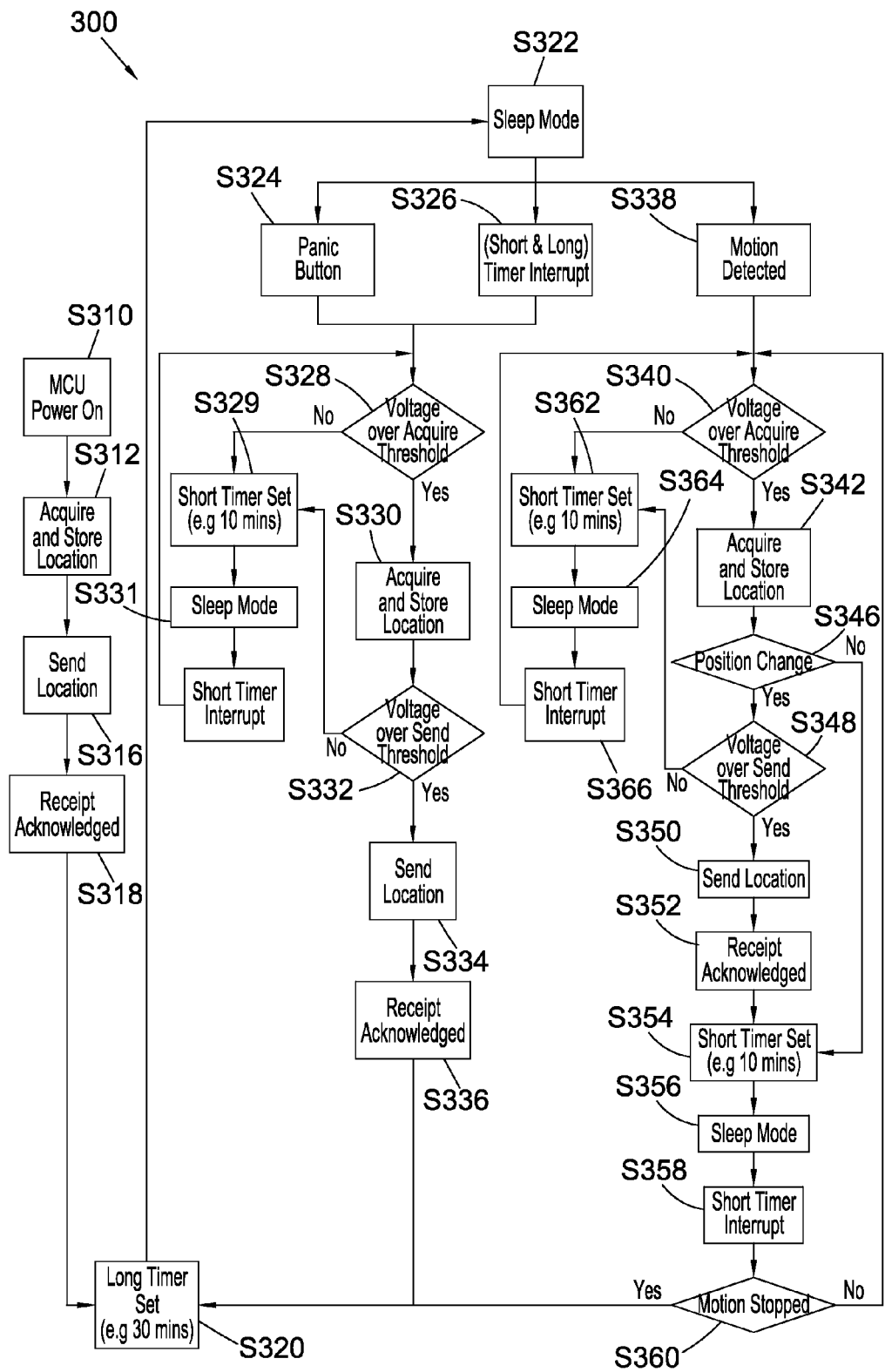
FIG. 3 is a flowchart showing the operation of the tracking operations module of FIG. 2.

The operation of the tracking operations module 104 is shown in the flowchart 300 of FIG. 3.

Once the super-capacitor 110 has sufficient voltage to power the MCU 118, which in the case of this invention is 2.2 volts, power is provided by the power control bus 120 to the MCU 118. The Renesas MCU 118 incorporates a discrete hardware component inside the processor which serves as a physical timer and which does not need initialising as it initialises itself following a reset and serves to turn on the MCU 118.

The MCU 118 is powered up at step S310 and the MCU 118 instructs the GPS controller 122 to acquire a location of the tracking device 100 at step S312 and store it in the memory 138. An "acquire threshold" is the voltage on the power bus 116 which is sufficient to power up and operate the GPS controller 122, and is referred to below as the third threshold voltage.

At step S312 the position of the tracking device 100 is acquired and stored in the memory 138. At step S316 the MCU 118 instructs the GSM controller 126 to send the position report to a remote server via the antenna 128 and at step S318 the GSM controller 126 passes a receipt acknowledgement to the MCU 118. At this point, the location of the tracking device 100 has been logged with the server and the operation proceeds to step S320 where a timer is set for a period of time which in present embodiment is ten minutes. In other embodiments this period of time may be a different length of time. The tracking device 100 then enters sleep mode at step S322.

The reason why there is the third "acquire threshold" voltage and a fourth "send threshold" voltage is that the acquisition of the location information by the GPS controller 122 draws less current than the sending of the position report by the GSM controller 126. Hence as part of the power optimization of the tracking device 100 it is configured to only send the position report when there is a change to the location that is greater than a pre-determined distance and there is sufficient stored power to provide for the further operation of the tracking device 100.

At step S322 the tracking device enters the sleep mode. The sleep mode is the operating mode of the tracking device 100 for most of the time after electrical energy has been stored in the super-capacitor 110 and the rechargeable battery 112 and in this mode the tracking device 100 conserves its energy as much as practicable.

The tracking device 100 will leave sleep mode S322 under a number of scenarios.

At the end of the short timer interval, an interrupt is issued at step S326 and the tracking device 100 wakes up and the power management controller checks if the voltage on the power bus 116 is over the third "acquire threshold". If the MCU 118 determines that the voltage on the power bus 116 is over the third "acquire threshold" at step S328, then the process proceeds to step S330 where the GPS controller 122 acquires the present location and stores it in the memory 138 of the tracking device 100. Once the present location of the tracking device 100 has been acquired, the process proceeds to step S332 where the MCU 118 determines if the voltage on the power bus 116 is over the fourth "send threshold". If the MCU 118 determines at this stage that the voltage on the power bus 116 is over the fourth "send threshold" then the location is sent to the server at step S334 and an acknowledgement is received back from the server at step S336, similar to steps S316 and S318 respectively.

Following step S336, the timer is reset at step S320 and the tracking device 100 enters sleep mode at step S322.

If the emergency/panic button 132 is pressed at step S324 an interrupt is issued and the tracking device 100 wakes up and the MCU 118 checks if the voltage on the power bus 116 is over the third "acquire threshold". If the MCU 118 determines that the voltage on the power bus 116 is over the third "acquire threshold" at step S328, then the process proceeds to step S330 where the GPS controller 122 acquires and stores the present location of the tracking device 100. Once the present location of the tracking device 100 has been acquired, the process proceeds to step S332 where the MCU 118 determines if the voltage on the power bus 116 is over the fourth "send threshold". If the MCU 118 determines at this stage that the voltage on the power bus 116 is over the fourth "send threshold" then the location is sent to the server at step S334 and an acknowledgement is received back from the server at step S336, similar to steps S316 and S318 respectively. Following step S336, the timer is reset at step S320 and the tracking device 100 enters sleep mode at step S322.

If at step S328 the MCU 118 determines that the voltage on the power bus 116 is not over the third "acquire threshold" then the process proceeds to step S329 where the timer is reset to ten minutes or some other pre-determined interval (a variable) and the tracking device enters the sleep mode at step S331. Similarly, if at step S332 the MCU 118 determines that the voltage on the power bus 116 is not over the fourth "send threshold" voltage then the process proceeds to step S329 where the timer is reset and the tracking device enters the sleep mode at step S331.

The process described above relates to the operation of the tracking device 100 when the emergency button 132 is pressed. If a remote third party triggers a "where are you now?" operation of the tracking device 100, by sending an emergency message to the tracking device 100 via the GSM controller 126 and antenna 128 then the operation of the tracking device 100 follows the same steps from step S324 through to S336 as described above.

Unless the tracking device 100 is actually sending a message with the location data, the GSM controller/modem 126 on the tracking device 100 is turned off to save power and it is therefore unable to hear or respond to an incoming 'where are you now?' request. Such a request would, therefore, be answered by the server.

If the tracking device 100 is in short timer (moving) mode and a 'where are you now?' request is made, the server sends the last reported position and since the tracking device 100 is moving, a new report will be sent at the end of the 'short sleep' condition.

If the tracking device 100 is in long sleep mode, the modem 126 is turned off and is therefore unable to listen for an incoming 'where are you now?' request. Instead, the message generated by an action on the user interface sends a message to the server and the server responds by sending the last known location back to the user's interface. This is deemed reasonable because if the tracking device 100 has moved from its last position, the motion detector/accelerometer 136 would have sent an interrupt to the MCU 118 and the tracking device 100 would have 'woken' and sent a new location position. Since the accelerometer 136 on the tracking device 100 has not been activated, it is safe to assume that the tracking device 100 has not moved so the last known location should still be relevant.

In the user interface, the user can designate whether the tracking device 100 has been positioned on something that is expected to move (dynamic mode), on something that is not expected to move (static mode) or on something where movement is expected but where a re-positioning of the object is not desired (protected mode).

The motion detector 136 is used to detect if the tracking device 100 has been moved. For example, if the tracking device 100 is attached to an object which should not be moved (static mode) then the tracking device 100 can be used to detect an unauthorised movement of that object. When the tracking device 100 is in sleep mode S322, if motion is detected at step S338, an interrupt is generated to wake up the MCU 118 and if the movement or vibration is of sufficient intensity or lasts a sufficiently long time to be interpreted by the on board logic to represent unauthorised movement, then the MCU 118 determines if the voltage on the power bus 116 is over the "acquire threshold", at step S340. If the MCU 118 determines that the voltage on the power bus 116 is over the "acquire threshold" then at step S342 the MCU 118 instructs the GPS controller 122 to acquire and store the location of the tracking device 100. At step S346, the MCU 118 compares the newly acquired location with the previously stored location (either at steps S312 or S330, or at a previous occurrence of step S342) then the MCU 118 checks if the voltage on the power bus 116 is over the "send threshold" at step S348.

If at step S348 the MCU 118 determines that the voltage on the power bus 116 is over the "send threshold" then at step S350 the location report is sent via the GSM controller 126 and antenna 128 to the server and a receipt is acknowledged at step S352. The server sends the location data to the browser based interface and sends an alarm message as an SMS message to the user's mobile telephone number and/or to the user's email address (both of which are required as part of the registration process).

If the tracking device 100 is attached to an object which is expected to move (dynamic mode) and if the tracking device 100 is in sleep mode S322, if motion is detected at step S338, an interrupt is generated to wake up the MCU 118 and then the MCU 118 determines if the voltage on the power bus 116 is over the "acquire threshold", at step S340. If the MCU 118 determines that the voltage on the power bus 116 is over the "acquire threshold" then at step S342 the MCU 118 instructs the GPS controller 122 to acquire and store the location of the tracking device 100. At step S346, the MCU 118 compares the newly acquired location with the previously stored location (either at steps S312 or S330, or at a previous occurrence of step S342) and if it is determined that there has been a change in the location of the tracking device 100 greater than a pre-determined distance, then the MCU 118 checks if the voltage on the power bus 116 is over the "send threshold" at step S348. If at step S348 the MCU 118 determines that the voltage on the power bus 116 is over the "send threshold" then at step S350 the location report is sent via the GSM controller 126 and antenna 128 to the server and a receipt is acknowledged at step S352. The server sends the location data to the browser based interface and no alarm message is sent.

If however the tracking device 100 is attached to an object where movement is expected but which should not be repositioned such as on a boat or pleasure craft for example, (protected mode) and if the tracking device 100 is in sleep mode S322, if motion is detected at step S338, an interrupt is generated to wake up the MCU 118 and if the movement or vibration is of sufficient intensity or lasts a sufficiently long time to be interpreted by the on board logic to represent the possibility of unauthorised movement, an interrupt is generated to wake up the MCU 118. The MCU 118 determines if the voltage on the power bus 116 is over the "acquire threshold", at step S340 then at step S342 the MCU 118 instructs the GPS controller 122 to acquire and store the location of the tracking device 100. At step S346, the MCU 118 compares the newly acquired location with the previously stored location (either at steps S312 or S330, or at a previous occurrence of step S342) and if it is determined that there has been a change in the location of the tracking device 100 greater than a pre-determined distance or if the new position means that the tracking device has crossed a user defined geo-fence, then the MCU 118 checks if the voltage on the power bus 116 is over the "send threshold" at step S348. If at step S348 the MCU 118 determines that the voltage on the power bus 116 is over the "send threshold" then at step S350 the location report is sent via the GSM controller 126 and antenna 128 to the server and a receipt is acknowledged at step S352. The server sends the location data to the browser based interface and sends an alarm message to the user's mobile telephone number and the user's email address.

The process then proceeds to step S354 where the timer is reset at the short timer variable and the sleep mode is entered at step S356. This shorter reset time compared to step S320 is required since the tracking device 100 is in motion and hence a more frequent location acquisition is appropriate. After the short timer interval has passed then at step S358 the timer interrupt causes the MCU 118 to determine if there is motion or if the motion has stopped at step S360, based upon the status of the motion detector 136. If the motion has not stopped then the process returns to step S340. The previously described process from step S340 to step S354 is then repeated, assuming that the voltage of the power bus 116 is over the "acquire threshold" and the "send threshold" and that there has been a subsequent change in position determined at step S346.

In the loop from step S340 to step S354, if it is determined at step S340 or at step S348 that the voltage on the power bus 116 is not over the "acquire threshold" and the "send threshold" respective voltages then the process proceeds to step S362 where the timer is reset to the short timer interval and sleep mode is entered at step S364. Similarly, if at step S346 after the location has been acquired at step S342 it is determined that there has been no significant change in position of the tracking device 100 then the process proceeds to step S354 where the timer is reset at the short timer interval. A negative response at step S346 may mean that the tracking device 100 or the object to which it has been attached has been knocked or disturbed in some way without necessarily an unauthorised movement of the object itself. Hence, whilst motion is detected at the motion detector 136 but there is no change of location of the tracking device 100, there is no need to send a position report to the server at step S350, thereby conserving the power stored in the supercapacitor 110 and the rechargeable battery 112. In a further scenario, if neither the emergency button 132 is pressed nor if there is any motion detected at the motion detector 136 then the tracking device 100 will wake up from the sleep mode entered at step S322 when the long timer interval has elapsed after the timer was reset at S320.

The timer interrupt is initiated at step S326 after which the operation of the tracking device proceeds through steps S328 to S320 as described above with reference to activation of the emergency button 132 at step S324.

Figure 4:
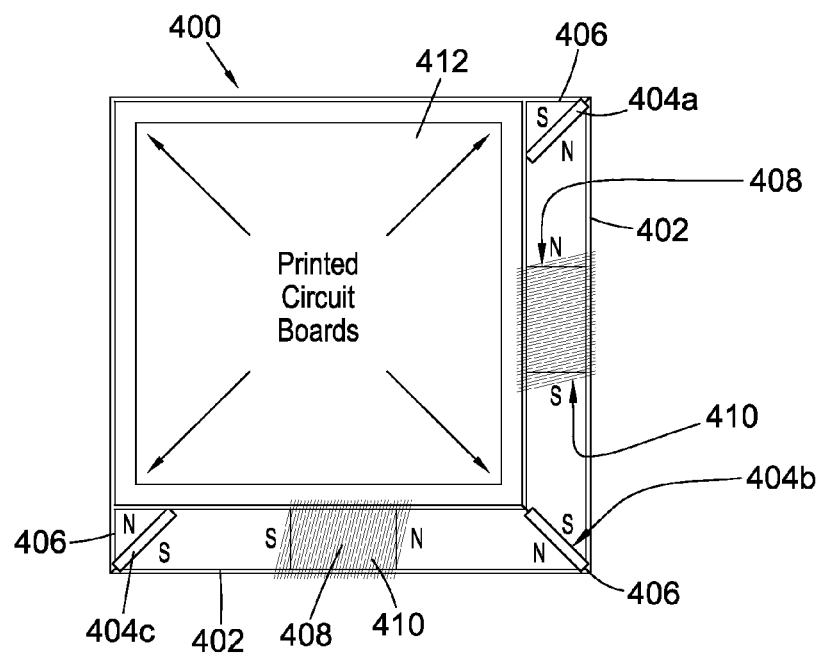
FIG. 4 shows a kinetic energy electric charge generator according to an embodiment of the invention forming part of the tracking device of FIG. 1.

FIG. 4 shows a kinetic energy electric charge generator 400 according to an embodiment of the invention. The generator 400 comprises a pair of tubes 402 running orthogonal edges of the printed circuit board 412 which carries the components shown in FIG. 1. A magnet 404*a,b,c* is fixed at ends 406 of each tube 402 with polarity as shown. The magnet 404*b* which is at the ends 406 of the tubes 402 where the two tubes 402 meet is a single magnet 404*b*. Since the magnet 404*b* is fixed at 45 degrees to the tubes 402 one side of the magnet 404*b* which faces one tube has a first polarity and the other side of the magnet 404*b* which faces the other tube has the opposite polarity.

A high intensity magnet 408 is disposed inside each tube 402. The magnet 408 may be a neodymium magnet, for example of intensity N52. Each magnet 408 is free to slide along the length of its respective tube 402. The polarity of the sliding magnet 408 is such that it matches the polarity presented to it by the end magnets 404*a,b,c*, i.e., the sliding magnets 408 are repelled by the respective magnets 404*a,b,c* at the ends 406 of the tubes 402.

A copper winding/coil 410 is wound around each tube 402. Whenever the sliding magnet 408 moves along its tube 402 a current is generated in the copper winding 410 as the magnet 408 passes therethrough. Hence, motion of the kinetic energy electric charge generator 400 instigates an oscillation of the freely moving magnets 408. As a freely moving magnet 408 approaches an end 406 of its tube 402, the stationary magnet 404*a,b,c* whose polarity matches the polarity of the approaching magnet 408 exerts a repelling force which pushes the magnet 408 away. This process is repeated so that even minor motion produces a highly excited activity of the freely moving magnet 408 past the coil 410. Consequently motion of the freely moving magnet 408 generates a power impulse which is sent to a rectifier and then on to the power management controller 108 of FIG. 1.

Figure 5:
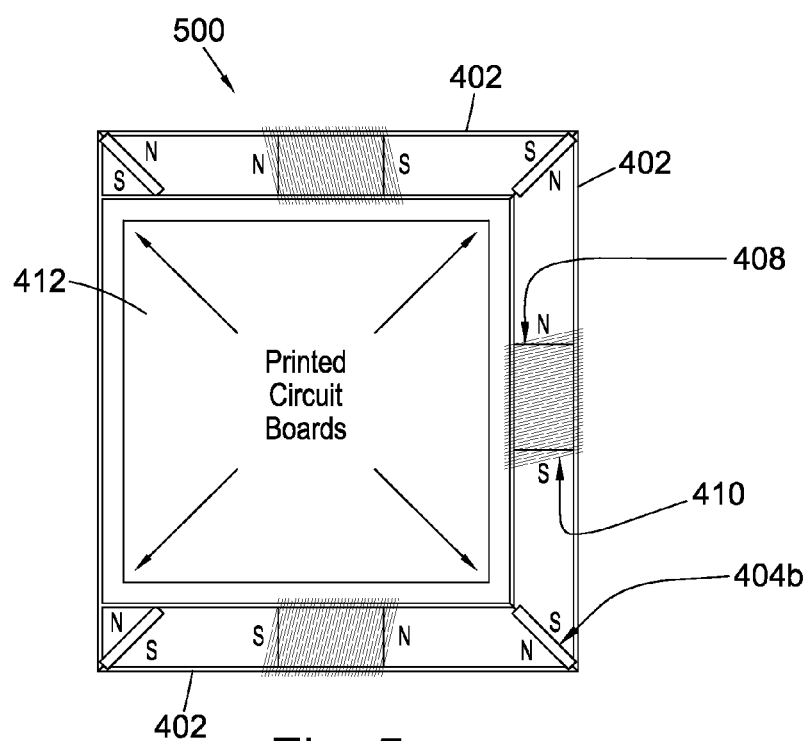
FIG. 5 shows an alternative kinetic energy electric charge generator forming part of the tracking device of FIG. 1.

FIG. 5 shows a kinetic energy electric charge generator 500 according to a further embodiment of the invention. The generator 500 is similar to the kinetic energy electric charge generator 400 of FIG. 4 but includes three tubes 402 around three of the peripheral edges of the printed circuit board 412.

Figure 6:
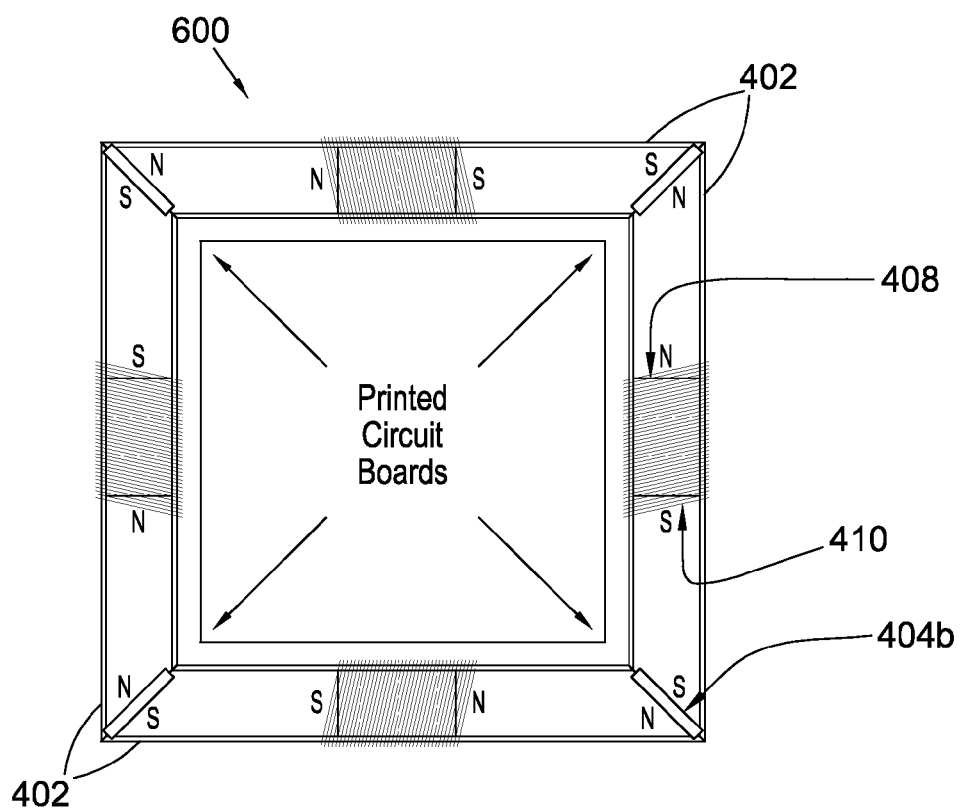
FIG. 6 shows a further alternative kinetic energy electric charge generator forming part of the tracking device of FIG. 1

FIG. 6 shows a kinetic energy electric charge generator 600 according to a further embodiment of the invention. The generator 600 is similar to the kinetic energy electric charge generator 400 of FIG. 4 but includes four tubes 402 around the periphery of the printed circuit board 412.

Figure 7:
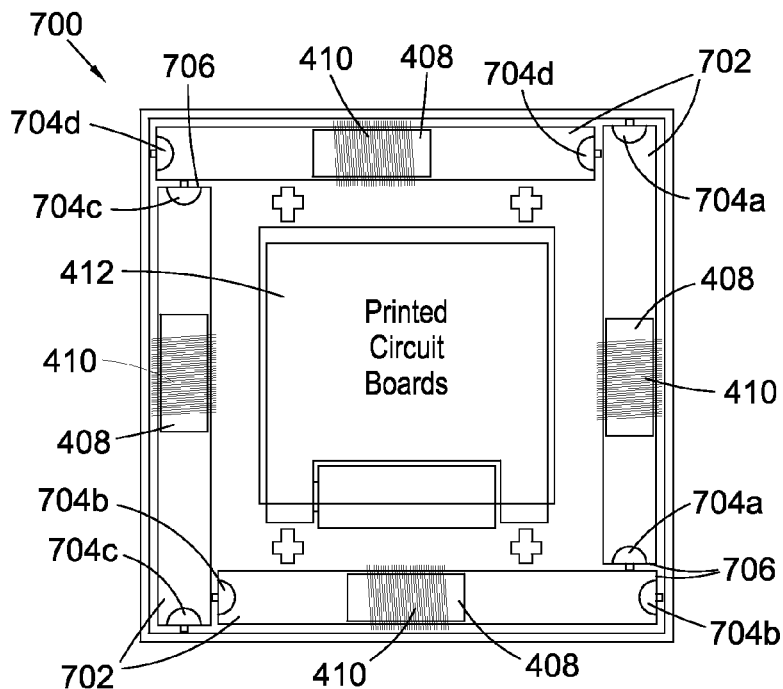
FIG. 7 shows a further alternative kinetic energy electric charge generator forming part of the tracking device of FIG. 1.

FIG. 7 shows an alternative kinetic energy electric charge generator 700 according to an embodiment of the invention. The generator 700 comprises four tubes 702 running along edges of the printed circuit boards 412 which carries the components shown in FIG. 1. As with the embodiments of FIGS. 4-6, a high intensity magnet 408 is disposed inside each tube 702 and a copper winding/coil 410 is wound around each tube 702. Unlike the embodiments of FIGS. 4-6, the generator 700 does not comprise magnets at ends of the tubes 702. Rather bumpers 704*a,b,c,d* are provided at each end 706 of the tubes 702. The bumpers 704*a,b,c,d* are made of an elastomeric material, such as rubber, or springs may be used. The bumpers 704*a,b,c,d* may be made from a non-ferrous material so that the bumpers 704*a,b,c,d* are not magnetised by the motion of the magnets 408, which may reduce their generating effect. The bumpers' 704*a,b,c,d* function is to rebound the shuffling magnet 408. As the freely moving magnets 408 pass through the coils 410 a current is generated in the coils 410. When the magnets 408 impact with the bumpers 704*a,b,c,d* at the ends 706 of the tubes 702, the magnets 408 rebound back past the copper windings 410 in order to maximise the generation of electrical power.

Figure 8:
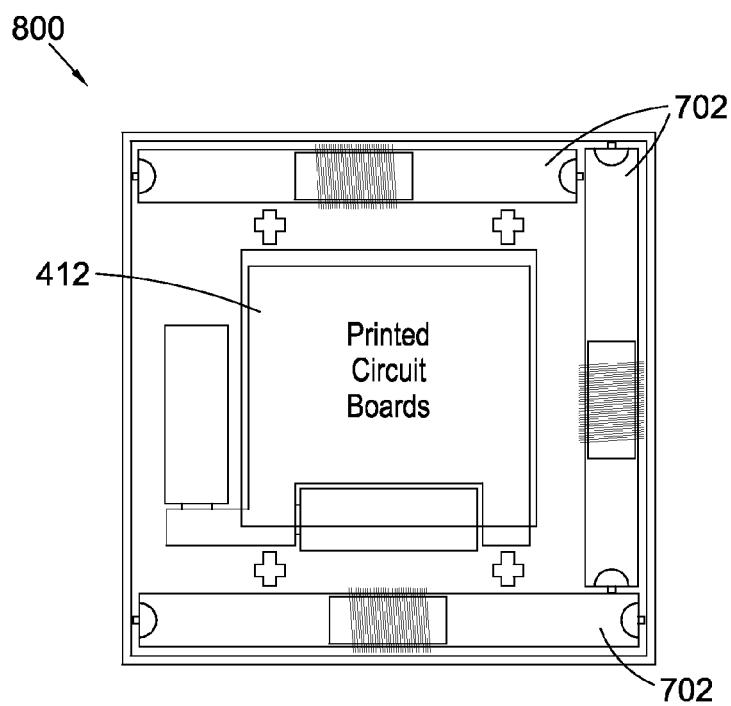
FIG. 8 shows a further alternative kinetic energy electric charge generator forming part of the tracking device of FIG. 1.

FIG. 8 shows a kinetic energy electric charge generator 800 according to a further embodiment of the invention. The generator 800 is similar to the kinetic energy electric charge generator 700 of FIG. 7 but includes three tubes 702 around three of the peripheral edges of the printed circuit board 412.

Various modifications will be apparent to those in the art and it is desired to include all such modifications as fall within the scope of the accompanying claims.

The tracking device described above is used for tracking a location of an object to which the device is attached. The skilled person will understand that the energy management features of this invention can be used in applications other than GPS tracking. For example single or multi-purpose remote sensing devices to detect and report such things as but not limited to vibration, heat, humidity, flow characteristics, chemical signatures and other information related to its environment or proximity to other devices.

In the embodiment described above the power management controller 108, the MCU 118, the GPS controller 122 and the GSM controller 126 are described as discrete components. An advantage of having these parts as discrete components is that they are only invoked when required, thereby conserving energy. The skilled person will understand that these components represent functional blocks in the architecture of the tracking device 100 and in other embodiments of the invention two or more of these blocks may be combined. For example the functionality of the power management controller 108 and the MCU 118 may be combined into a single components, such as an application-specific integrated circuit (ASIC).

In the embodiment described above the tracking device 100 is configured to respond to a third party originated "where are you now?" request. The skilled person will appreciate that this is not an essential feature of the invention and in some embodiments this feature may not be present. For example, this feature may be omitted if it is desired to reduce the power consumption of the tracking device by removing the need for the device to 'listen' for a "where are you now?" request signal from the server. Instead, rather than the tracking device 100 responding to a "where are you now?" request, the server may provide the last known location of the tracking device 100.

In the embodiment described above, after movement of the tracking device 100 is detected the tracking device 100 is configured to first obtain a new location at step S342 prior to sending the location at S350. In alternative embodiments steps S340-S346 may be omitted. In such a case as soon as motion of the tracking device 100 is detected its location will be transmitted at step S350 without first obtaining an updated location. When movement is detected it is clear that not only is the location of the tracking device 100 sent to the server but that this message is accompanied by alarm to alert to the potentially unauthorised movement of the tracking device 100.

In the embodiment described above the second electrical power storage cell is a rechargeable lithium polymer battery. In other embodiments other types of rechargeable batteries may be used and storage cells other than batteries may be used.

In the embodiment described above the means for transmitting the data about the location of the tracking device is a GSM controller 126 and antenna 128. In other embodiments other wireless transmission protocols may be used, such as LTE, UMTS, Bluetooth®, WiFi® and other low power radio transmission protocols designed for M2M communications.

In the embodiment described above the timer reset periods are ten minutes (short) and thirty minutes (long). In other embodiments different wait intervals may be used. For example, the long reset period may be four hours. Alternatively, if a reset period is triggered because of insufficient electrical power stored in the electrical power cells, the wait intervals may progressively increase in order to give the tracking device 100 more time to store the requisite electrical power.

In FIGS. 4-8 the tubes 402 are arranged in the plane of the printed circuit board 412. In other embodiments it may be advantageous to have magnet tubes 402 in each of the three orthogonal directions so that any movement of the tracking device will generate movement of a magnet 408.

The invention claimed is:

1. A power module for a mobile device, the power module comprising:
   a power bus;
   first and second electrical power storage cells of different types, each of the first and second electrical power storage cells being arranged to provide stored electrical power to the power bus;
   an energy harvester for generating electrical power to charge the electrical power storage cells;
   a switch for routing the generated electrical power to one of the first and second electrical power storage cells; and
   processing means arranged to monitor the electrical power stored in one or both of the electrical power storage cells and control the switch.

2. The power module as claimed in claim 1, wherein the first electrical power storage cell is a super-capacitor.

3. The power module as claimed in claim 1, wherein the second electrical power storage cell is a rechargeable battery.

4. The power module as claimed in claim 1, wherein when the first electrical power storage cell is to be charged the processing means is arranged to initially charge the first electrical power storage cell and subsequently to charge the second electrical power storage cell.

5. The power module as claimed in claim 4, wherein the processing means is arranged to control the switch:
   to charge the first electrical power storage cell until the power stored in the first electrical power storage cell exceeds a first threshold;
   to then charge the second electrical power storage cell; and
   when the power stored in the first electrical power storage cell falls below a second threshold which is lower than the first threshold, to then recharge the first electrical power storage cell.

6. The power module as claimed in claim 5, wherein the first and second threshold power levels are determined by monitoring a voltage of the first electrical power storage cell and are first and second threshold voltages respectively.

7. The power module as claimed in claim 1, wherein the processing means are arranged to monitor the electrical power stored both of the electrical power storage cells and when both the first and second electrical power storage cells are to be charged the processing means is arranged to initially charge the first electrical power storage cell and subsequently to charge the second electrical power storage cell.

8. The power module as claimed in claim 1, wherein the energy harvester is such that the tracking device does not need to receive electrical charge from an external electrical power supply.

9. The power module as claimed in claim 1, wherein the energy harvester is one or more of a photovoltaic cell, a kinetic energy harvester, a thermo-energy harvester and an ambient radio frequency harvester.

10. The power module as claimed in claim 9, wherein the kinetic energy harvester comprises at least one of a piezo-electric sensor and an electromagnetic sensor.

11. The power module as claimed in claim 1, wherein the processing means is a single or a plurality of microprocessors.

12. A tracking device comprising:
   a power module comprising:
      a power bus;
      first and second electrical power storage cells of different types, each of the first and second electrical power storage cells arranged to provide stored electrical power to the power bus;
      an energy harvester for generating electrical power to charge the electrical power storage cells;
      a switch for routing the generated electrical power to one of the first and second electrical power storage cells; and
      processing means arranged to monitor the electrical power stored in one or both of the electrical power storage cells and control the switch,
   means for receiving data about a location of the tracking device;
   means for storing the data about the location of the tracking device;
   means for wirelessly transmitting the data about the location of the tracking device; and
   a motion sensor;
   wherein the processing means are further arranged to manage receipt and transmission of the data about the location of the tracking device.

13. The tracking device as claimed in claim 12, wherein the means for receiving data about a location of the tracking device is a GPS module.

14. The tracking device as claimed in claim 12, wherein the means for transmitting data about the location of the tracking device is a radio frequency transceiver such as a GSM, UMTS, LTE or ISM band transceiver.

15. A method of charging a power module the power module comprising:
   a power bus;
   first and second electrical power storage cells of different types, each of the first and second electrical power storage cells being arranged to provide stored electrical power to the power bus;
   an energy harvester for generating electrical power to charge the electrical power storage cells;
   a switch for routing the generated electrical power to one of the first and second electrical power storage cells; and
   processing means arranged to monitor the electrical power stored in one or both of the electrical power storage cells and control the switch;
   the method comprising:
   charging the first electrical power storage cell until the power stored in the first electrical power storage cell exceeds a first threshold;
   then charging the second electrical power storage cell; and
   when the power stored in the first electrical power storage cell falls below a second threshold which is lower than the first threshold, then recharging the first electrical power storage cell.

16. The method as claimed in claim 15, wherein the first and second threshold power levels are determined by monitoring a voltage of the first electrical power storage cell and are first and second threshold voltages respectively.

17. A method of tracking an object, comprising:
   (a) attaching to the object a tracking device comprising:
      a power module comprising:
         a power bus;
         first and second electrical power storage cells of different types, each of the first and second electrical power storage cells arranged to provide stored electrical power to the power bus;

an energy harvester for generating electrical power to charge the electrical power storage cells;

a switch for routing the generated electrical power to one of the first and second electrical power storage cells; and processing means arranged to monitor the electrical power stored in one or both of the electrical power storage cells and control the switch;

means for receiving data about a location of the tracking device;

means for storing the data about the location of the tracking device;

means for wirelessly transmitting the data about the location of the tracking device; and a motion sensor;

wherein the processing means are further arranged to manage receipt and transmission of the data about the location of the tracking device;

(b) generating electrical power in the energy harvester of the tracking device;

(c) charging the first electrical power storage cell of the tracking device;

(d) when the charge in one or both of the first and the second electrical power storage cells provides a voltage equal to or greater than a third threshold voltage, receiving data about a location of the tracking device;

(e) storing the data about the location of the tracking device;

(f) when the charge in one or both of the first and second electrical power storage cells provides a voltage equal to or greater than a fourth threshold voltage, transmitting the data about the location of the tracking device.

18. The method as claimed in claim 17, further comprising:

charging the second electrical power storage cell when the stored electrical power in the first electrical power storage cell reaches a threshold power, and automatically switching back from the second electrical power storage cell to charge first electrical power storage cell the when stored electrical power in the first electrical power storage cell reaches a lower threshold level of power.

19. The method as claimed in claim 17, further comprising:

repeating steps (d) to (f) after a predetermined period of time has elapsed since the data about the location of the tracking device was last transmitted or after a manual interrupt, such as activation of an alarm or panic button.

20. The method as claimed in claim 17, further comprising:

(g) detecting movement of the tracking device;

(h) repeating steps (d) and (e);

(i) comparing the last two locations of the tracking device to determine if the tracking device has changed location;

(j) if the change in location exceeds a predetermined amount, repeating step (f); and (k) if the change in location is less than a predetermined amount, repeating steps (g) to (j) after a predetermined period of time.

* * * * *